United States Patent
Park et al.

(10) Patent No.: US 9,934,170 B2
(45) Date of Patent: Apr. 3, 2018

(54) CIRCUIT FOR CONTROLLING ACCESS TO MEMORY USING ARBITER

(71) Applicant: SILICONFILE TECHNOLOGIES INC., Gyeonggi-do (KR)

(72) Inventors: Seong Jun Park, Gyeonggi-do (KR); Huy Chan Jung, Gyeonggi-do (KR); Sang Wook Ahn, Gyeonggi-do (KR)

(73) Assignee: SILICONFILE TECHNOLOGIES INC., Gyeonggi-do (KR)

( * ) Notice: Subject to any disclaimer, the term of this patent is extended or adjusted under 35 U.S.C. 154(b) by 39 days.

(21) Appl. No.: 15/108,537

(22) PCT Filed: Nov. 27, 2014

(86) PCT No.: PCT/KR2014/011480
§ 371 (c)(1),
(2) Date: Jun. 27, 2016

(87) PCT Pub. No.: WO2015/099301
PCT Pub. Date: Jul. 2, 2015

(65) Prior Publication Data
US 2016/0321196 A1 Nov. 3, 2016

(30) Foreign Application Priority Data
Dec. 27, 2013 (KR) .................. 10-2013-0165817

(51) Int. Cl.
*G06F 12/00* (2006.01)
*G06F 13/00* (2006.01)
*G06F 13/16* (2006.01)

(52) U.S. Cl.
CPC ...... *G06F 13/1605* (2013.01); *G06F 13/1689* (2013.01)

(58) Field of Classification Search
None
See application file for complete search history.

(56) References Cited

U.S. PATENT DOCUMENTS

2001/0025228 A1* 9/2001 Prantl .................. G06F 5/06
702/189
2004/0146030 A1* 7/2004 Hsieh ................ H04W 52/0248
370/336

(Continued)

FOREIGN PATENT DOCUMENTS

JP  2000-030460  1/2000
JP  2005-523536  8/2005

(Continued)

*Primary Examiner* — Hyun Nam
(74) *Attorney, Agent, or Firm* — IP & T Group LLP

(57) ABSTRACT

The present invention relates to a technology enabling a normal access by controlling a read access through an arbiter in a circuit for controlling an access to memory to which clock signals are input through two ports, respectively for a read access to a single port memory. The present invention includes an arbiter that generates an internal clock signal through a state transition among a first state for generating a first clock signal, a second state for generating a second clock signal, a standby state and a neutral state when generating the internal clock signal for reading data from the memory on the basis of the first clock signal and the second clock signal, and a read end signal that is supplied from the memory.

17 Claims, 12 Drawing Sheets

(56) References Cited

U.S. PATENT DOCUMENTS

| | | | | |
|---|---|---|---|---|
| 2006/0282588 | A1* | 12/2006 | Proujansky-Bell | G06F 13/1663 710/240 |
| 2010/0271895 | A1* | 10/2010 | Wang | G11C 7/1075 365/222 |
| 2013/0185491 | A1* | 7/2013 | Lin | G06F 13/1605 711/104 |
| 2015/0081934 | A1* | 3/2015 | Gupta | G06F 13/00 710/56 |

FOREIGN PATENT DOCUMENTS

| | | |
|---|---|---|
| KR | 100706801 | 4/2007 |
| KR | 1020090033190 | 4/2009 |
| WO | WO 2004/102406 | 11/2004 |

* cited by examiner

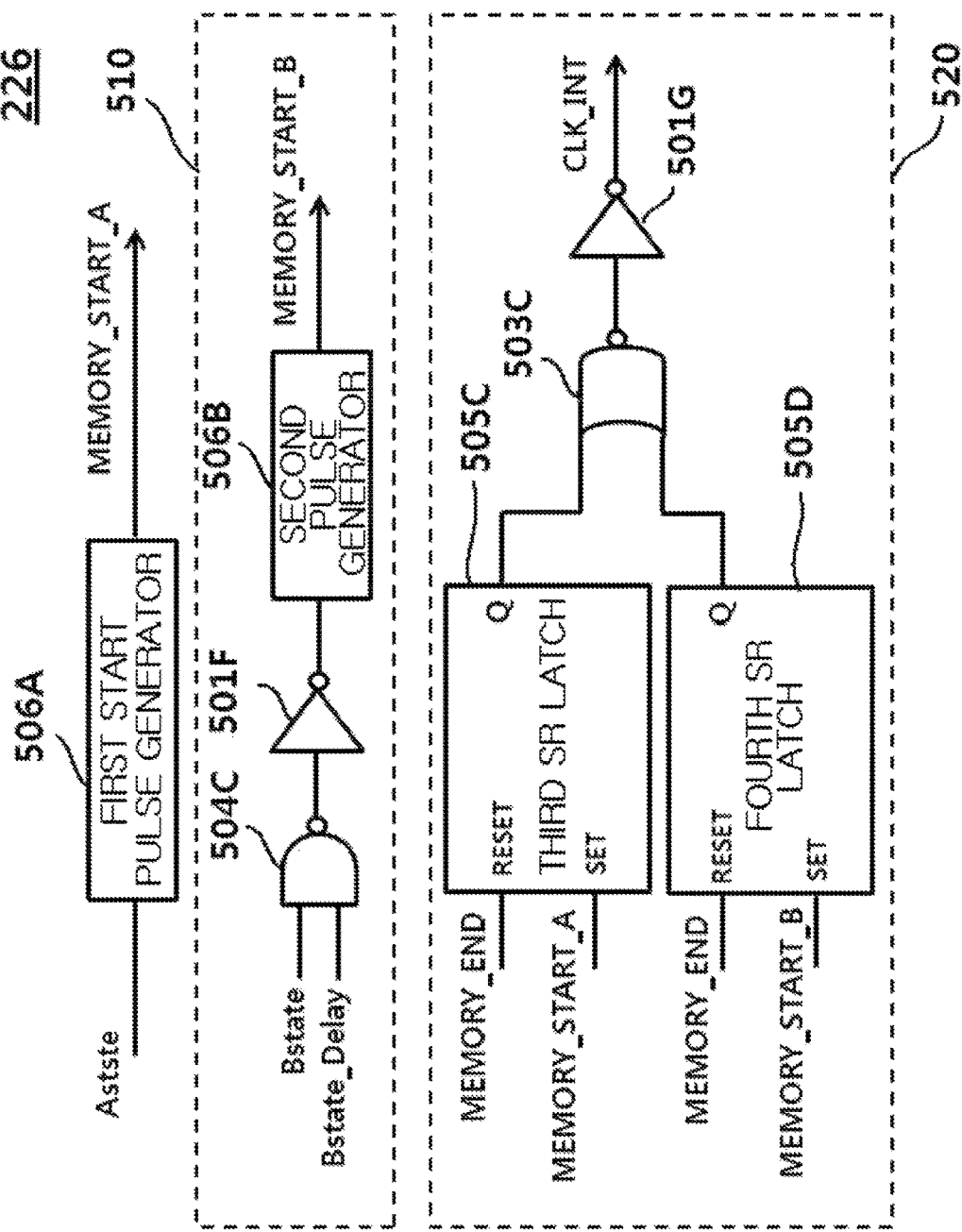

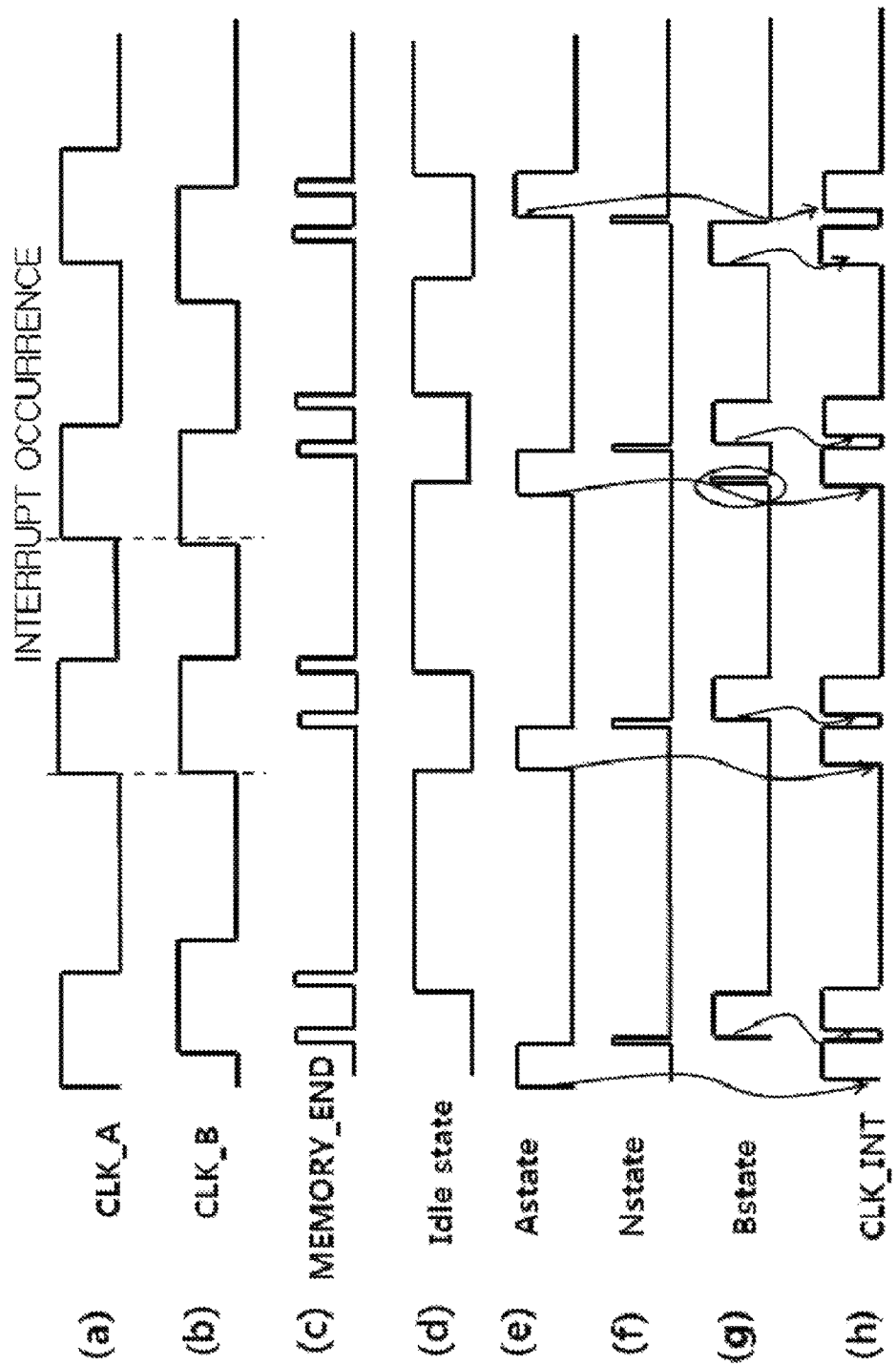

CIRCUIT FOR CONTROLLING ACCESS TO MEMORY USING ARBITER

This application is a national stage application of PCT/KR2014/011480 filed on Nov. 27, 2014, which claims priority of Korean patent application number 10-2013-0165817 filed on Dec. 27, 2013. The disclosure of each of the foregoing applications is incorporated herein by reference in its entirety.

TECHNICAL FIELD

The present invention relates to a technology for controlling an access operation of a single port memory using an arbiter, and more specifically, to a circuit for controlling an access to a memory using an arbiter that performs a normal read access by controlling a read access operation through the arbiter in a read access circuit of which an input signal is inputted through two input ports for a read access of a single port memory applied to a display driver integrated chip (DDI).

BACKGROUND ART

FIG. 1 is a block diagram illustrating an access control circuit of conventional single port memory, and as shown in FIG. 1, an access control circuit 100 includes a controller 110 and a memory 120. The memory 120 includes an address decoder and a data output buffer.

The memory 20 is a single port memory, includes a single input port for an access, and a single output port for a data output, Thus, a clock signal output terminal of the controller 110 is coupled to the input port of the memory 120 in one to one.

In a read mode, the controller 110 outputs a clock signal CLK having a predetermined shape to the clock signal output terminal. Herein, the memory 120 outputs the data stored in a corresponding address according to the clock signal CLK provided from the controller 110 through the input port. The data DOUT outputted from the output port of the memory 120 is inputted to the data input port of the controller 110.

In a write mode, the controller 110 outputs the data DIN to the memory 120 and stores the data DIN in a corresponding address, In a case that a dual port read access is performed in a memory 120 having a single port structure as described above, according to how much time difference between two clock signals inputted from the controller 110 to the memory 120, a signal may be overlapped in an address decoder and a data output buffer included in the memory 120.

Because of the reason described above, in case that a dual port read access is, performed in a memory having a single port structure, a read fail occurs and a normal read access is impossible. Thus, there are problems that a single port memory may be not applied to a DDI that needs an operation of a high performance.

DISCLOSURE

Technical Problem

The present invention is directed to an access control circuit of a memory using an arbiter that performs a normal read access without a read fail by arbitrating a read access operation through an arbiter when a clock signal is inputted through two input ports for an access of a single port memory.

The present invention is directed to an access control circuit of a memory using an arbiter to design a driving level of the arbiter with a transistor level using a state-transfer diagram as a digital design manner.

Technical Solution

In accordance with an embodiment of the present invention, a circuit for controlling access to a memory using an arbiter may include a controller for outputting a first clock signal to a first port and outputting a second clock signal to a second port; the arbiter for generating an internal clock signal by a state transfer among a first state for generating the first clock signal, a second state for generating the second clock signal, a standby state and a neutral state when the internal clock signal is generated based on the first clock signal, the second clock signal and a read end signal; and a memory for outputting the read end signal to the arbiter, and providing a first output data or a second output data to the controller by a read-access according to the internal clock signal.

Advantageous Effects

The present invention may perform a read access for a single port memory with a dual port memory manner by controlling two clock signals using an arbiter in a read access circuit of which a clock signal is outputted from a controller through two input ports for a read access of a single port memory.

Also, by designing a driving level of an arbiter with a transistor level based on a state-transfer diagram, an installation space of an arbiter is reduced, a high speed operation is performed, and a dead-zone free type may be implemented.

DESCRIPTION OF DRAWINGS

FIG. 5f is a detailed circuit diagram illustrating the internal clock signal generation unit shown in FIG. 4.

FIG. 7 is a timing diagram illustrating internal clock signals corresponding to a first clock signal and a second clock signal.

BEST MODE

Hereinafter, various embodiments will be described below in more detail with reference to the accompanying drawings such that a skilled person in this art understand and implement the present invention easily.

Figure 1:
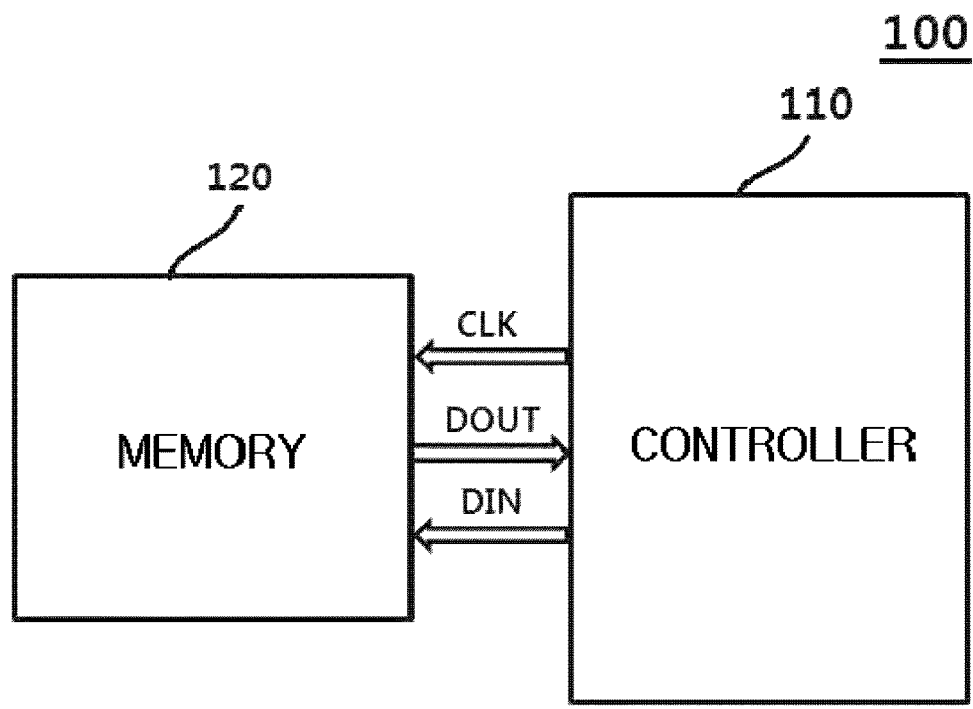
FIG. 1 is a block diagram illustrating an access control circuit of a conventional single port memory.
Figure 2:
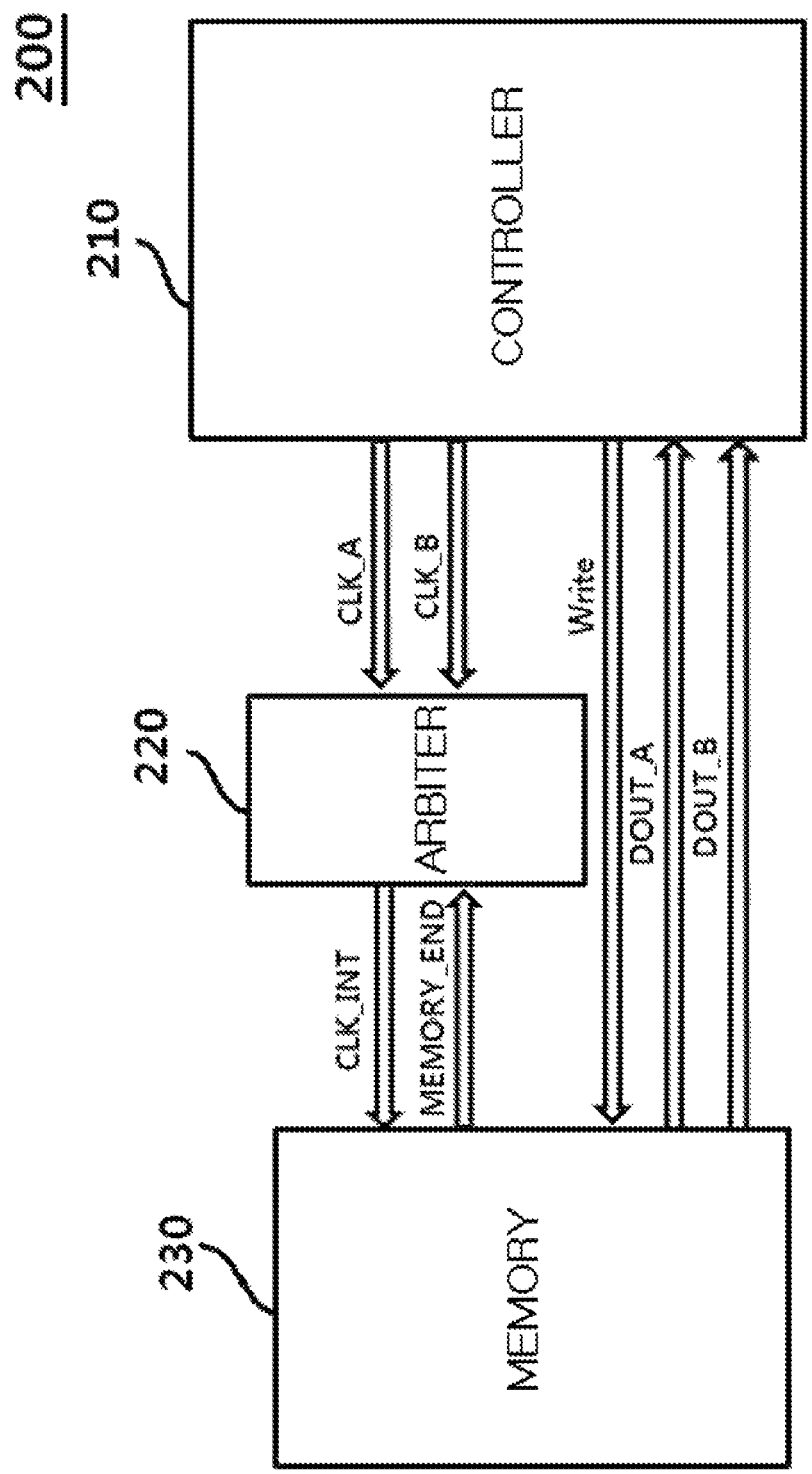
FIG. 2 is a block diagram illustrating an access control circuit using an arbiter in accordance with an embodiment of the present invention.

FIG. 2 is a block diagram illustrating an access control circuit using an arbiter in accordance with an embodiment of the present invention, and as shown in FIG. 2, an access control circuit 200 includes a controller 210, an arbiter 220 and a memory 230.

The controller 210 performs a read access operation of a dual port manner on a memory 230 which operates as a single port memory. That is, the controller 210 outputs a first clock signal CLK_A through a first port and a second clock signal CLK_B through a second port to perform a read access operation on the memory 230 with a dual port manner. A period and an input timing of the first clock signal CLK_A and the second clock signal CLK_B may be different from each other.

The arbiter 220 provides an internal clock signal CLK_INT to a single input port of the memory 230 such that a normal read access is performed on the memory 230 without a read fail based on the dual port read access operation of the controller 210. For this, the arbiter 220 receives the first clock signal CLK_A and the second clock signal CLK_B from the controller 210, and receives a read end signal MEMORY_END, which indicates the end of the read operation, from the memory 230, The read end signal MEMORY_END may be a sense amplifier enable signal of the memory 230. The arbiter 220 generates the internal clock signal CLK_INT such that the dual port read operation is normally performed on the memory 230 based on the first clock signal CLK_A and the second clock signal CLK_B.

The memory 230 provides a first output data DOUT_A or a second output data DOUT_B to the controller 210 in response to the internal clock signal CLK_INT generated through the above-described processes provided from the arbiter 220. The memory 230 stores corresponding data when a write control signal Write is provided from the controller 210.

Figure 3:
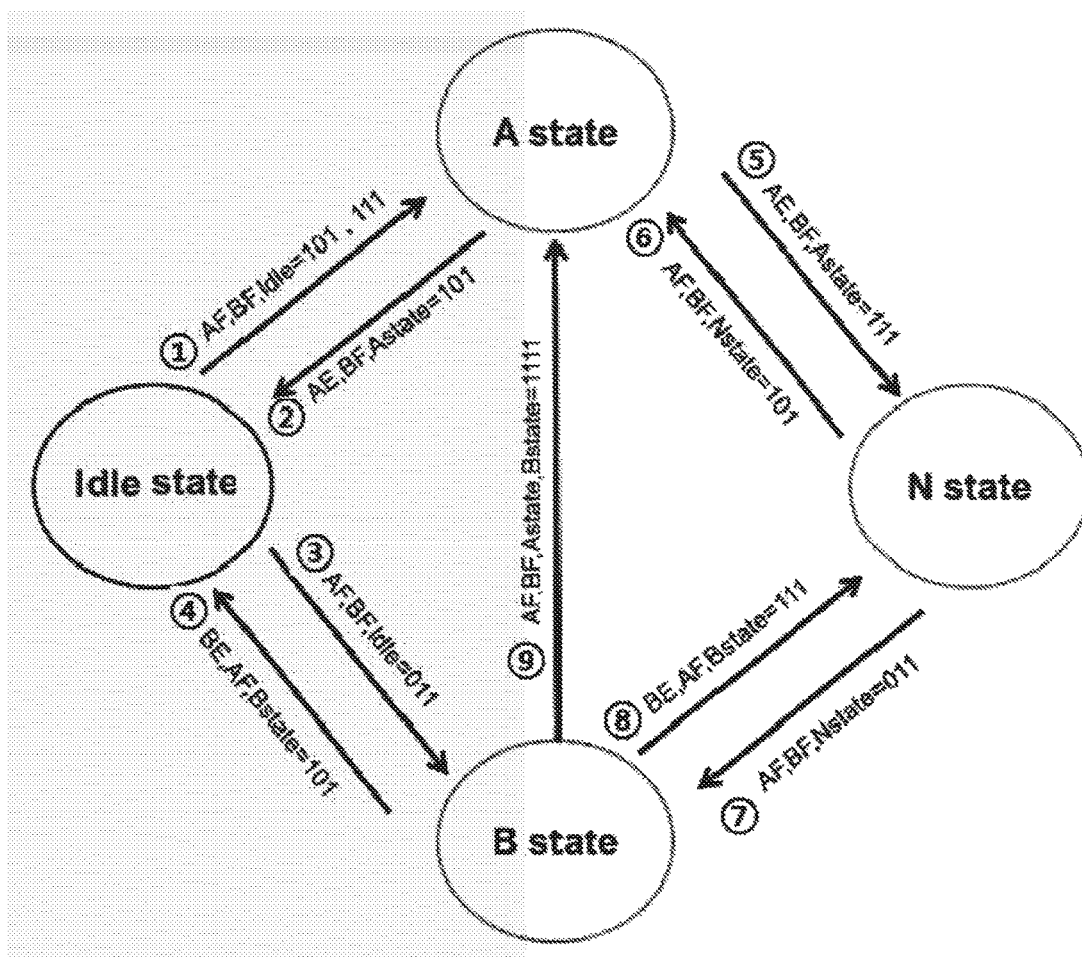
FIG. 3 is a diagram illustrating a state-transfer diagram of an arbiter.

FIG. 3 is a diagram illustrating a state-transfer diagram of an arbiter for generating the internal clock signal CLK_INT. By designing a driving level of the arbiter 220 with a transistor level based on a state-transfer diagram as shown in FIG. 3, an installation space of the arbiter 220 may be reduced, a high speed operation may be performed, and a dead-zone free type may be implemented. A state-transfer operation of the arbiter 220 in accordance with the present invention will be described with reference to FIG. 3 as below.

The arbiter 220 has four states, i.e., a first state A state, a second state B state, a standby state Idle state and a neutral state N state, and each state is transferred to other states according to a condition of signals of an arrow direction.

When the standby state Idle state or the neutral state N state is transferred to the first state A state or the second state B state, the arbiter 220 generates the internal clock signal CLK_INT corresponding to each state and provides the internal clock signal CLK_INT to the memory 230. A read access operation is performed by this.

Referring to signals shown in FIG. 3, 'AF' denotes a first flag signal, 'BF' denotes a second flag signal, 'AE' denotes a first port read end signal on the memory 230, 'BE' denotes a second port read end signal on the memory 230, and 'Idle' denotes a standby state signal for a read access of the memory 230. The 'Idle state' indicates the standby state, the 'A state' indicates the first state, the 'B state' indicates the second sate, and 'N state' indicates the neutral state. The first port read end signal AE and the second port read end signal BE are a read end signal MEMORY_END provided from the memory 230 after the read operation is terminated. The first flag signal AF is enabled when the first clock signal CLK_A is provided through the first port of the controller 210, and is disabled when the first port read end signal AE is provided from the memory 230. The second flag signal BF is enabled when the second clock signal CLK_B is provided through the second port of the controller 210, and is disabled when the second port read end signal BE is, provided from the memory 230.

If the state of the arbiter 230 is transferred from the first state A state to the second state B state by the signals of the arrows shown in FIG. 3, the memory 230 is read-accessed previously by the internal clock signal generated corresponding to the transferred state, Then, at the time of terminating the read access operation, a next state is transferred, and the memory 230 is read-accessed by the internal clock signal generated corresponding to the transferred state.

Moreover, if an interrupt case that all of the first port read end signal AE, the second port read end signal BE, the first state A state and the second state B state is enabled occurs, the second state B state is terminated and is transferred to the first state A state. In reality, referring to a result of a simulation that the access control circuit 200 is implemented, the above-described interrupt case occurs in case that the first clock signal CLK_A and the second clock signal CLK_B are inputted with a time difference of tens to hundreds of pico-seconds (ps).

The above-described interrupt case occurs necessarily according to the state of the input signals when input signals of each condition are combined in a digital circuit. Also, the above-described interrupt case may be more influenced according to a manufacturing process, a voltage, a temperature variation and a layout of the arbiter 220.

Thus, in the embodiment of the arbiter 220 of the present invention as shown in FIG. 3, the arbiter 220 operates with a dead-zone free type by designing the state-transfer diagram based on the above-described interrupt.

Also, the neutral state N state is added such that the transfer operation is normally performed in the interrupt case. Thus, when the first state A state is transferred to the second state B state or is transferred inversely, since the state transfer operation is necessarily performed through the neutral state N state, the interrupt case does not occur.

Referring to FIG. 3, each of the state transfer operations of the arbiter 220 will be described as below.

① indicates that under the condition that the current state is the standby state Idle state and the standby state signal Idle is enabled, if the first flag signal AF is enabled (AF=1) and the second flag signal BF is disabled (BF=0), i.e., in case of AF, BF, Idle='101', the standby state Idle state is transferred to the first state A state. If the current state is the standby state Idle state (Idle=1), the first flag signal AF is enabled (AF=1), and the second flag signal BF is enabled (BF=1), i.e., in case of AF, BF, Idle='111', the standby state Idle state is transferred to the first state A state.

② indicates that under the condition that the current state is the first state A and the first state A is enabled, if the first port read end signal AE is enabled (AE=1) and the second flag signal BF is disabled (BF=0) i.e., in case of AE, BF, A state='101', the current state is transferred from the first state A state to the standby state Idle state.

③ indicates that under the condition that the current state is the standby state Idle state and the standby state signal Idle is enabled, if the first flag signal AF is disabled (AF=0) and the second flag signal BF is enabled (BF=1), i.e., in case of AF, BF, Idle='011', the current state is transferred from the standby state Idle state to the second state B state.

④ indicates that under the condition; that the current state is the second state B state and the second state B state is enabled, if the second port read end signal BE is enabled (BE=1) and the first flag signal AF is disabled (AF=0), i.e., in case of BE, AF, B state='101' the current state is transferred from the second state B sate to the standby state Idle state.

⑤ indicates that under the condition that current state is the first state A state and the first state A state is enabled, if the first port read end signal AE is enabled (AE=1) and the second flag signal BF is enabled (BF=1), i.e., in case of AE, BF, A state='111', the current state is transferred from the first state A state to the neutral state N state.

⑥ indicates that under the condition that the current state is the neutral sate N state and the neutral state N state is enabled, if the first flag signal AF is enabled (AF=1) and the second flag signal BF is disabled (BF=0) i.e., in case of AF, BF, N state='101', the current state is transferred from the neutral state N state to the first state A state.

⑦ indicates that under the condition that the current state is the neutral state N state and the neutral state N is enabled, if the first flag signal AF is disabled (AF=0) and the second flag signal BF is enabled (BF=1), i.e., in case of AF, BF, N state='011', the current state is transferred from the neutral state N state to the second state B state.

⑧ indicates that under the condition that the current state is the second state B state and the second state B state is enabled, if the second port read end signal BE is enabled (BE=1) and the first flag signal AF is enabled (AF=1), i.e., in case of BE, AF, B state='111', the current state is transferred from the second state B state to the neutral state N state.

⑨ indicates that under the condition that the current state is the first state A state and the second state B sate, and all of the first state A state and the second state B state are enabled, if the first flag signal AF is enabled (AF=1) and the second flag signal BF is enabled (BF=1), i.e., in case of AF, BF, A state, B state ='1111', the current state is transferred from the second state B state to the first state A state.

Figure 4:
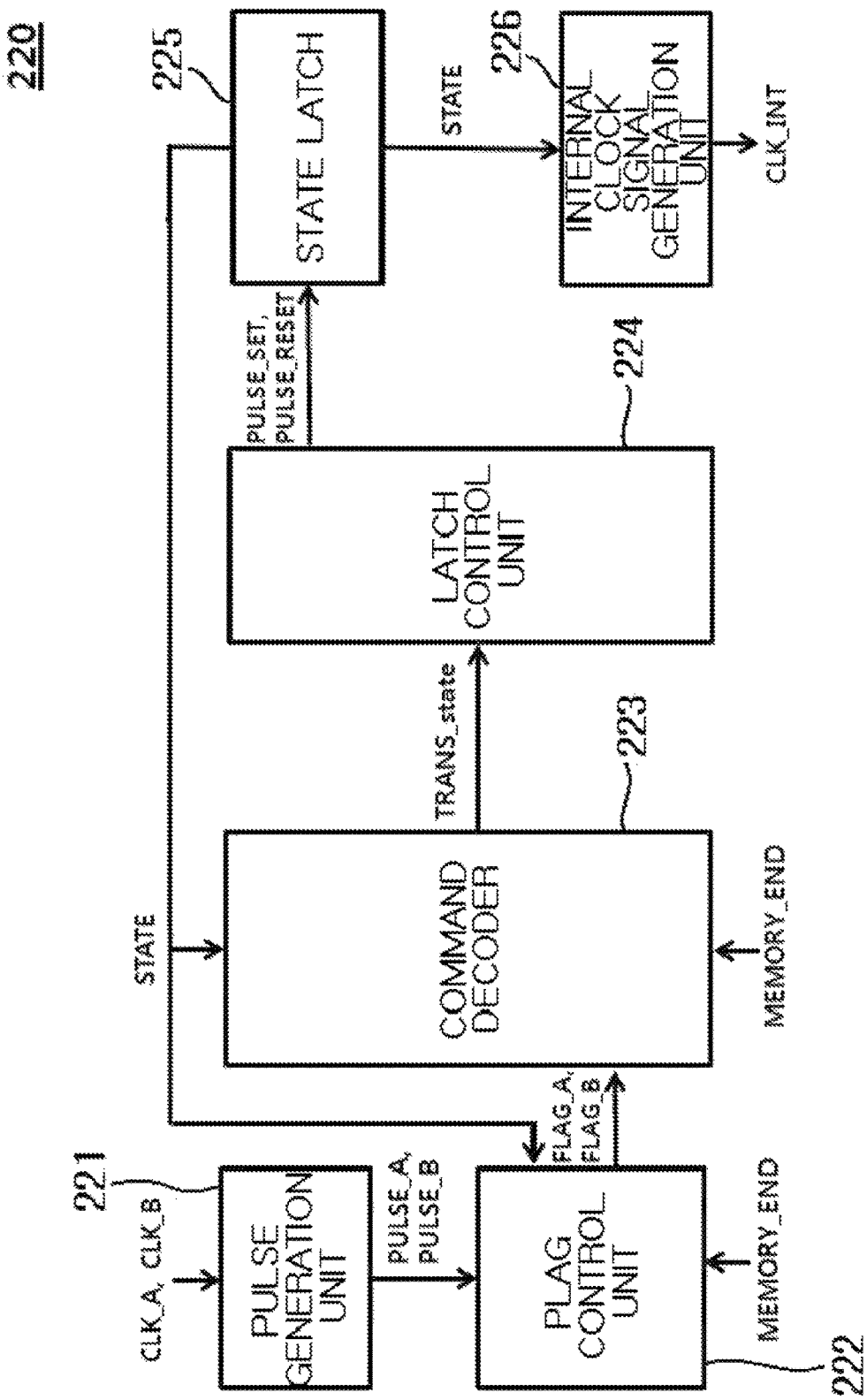
FIG. 4 is a detailed block diagram of the arbiter shown in FIG. 2.

Meanwhile, FIG. 4 is a detailed block diagram illustrating an example of the arbiter 220, and as shown in FIG. 4, the arbiter 220 includes a pulse generator 221, a flag control unit 222, command decoder 223, a latch control unit 224, a state latch 225 and an internal clock signal generation unit 226.

Referring to FIG. 4 the pulse generation unit 221 receives a first clock signal CLK_A and a second clock signal CLK_B from the controller 210 and generates a first pulse PULSE_A and a second pulse PULSE_B.

The flag control unit 222 performs calculations on the first pulse PULSE_A and the second pulse PULSE_B provided from the pulse generation unit 221, the read end signal MEMORY_END provided from the memory 230 and the state signal STATE provided from the state latch 225, and generates a first flag signal FLAG_A or a second flag signal FLAG_B.

The command decoder 223 performs calculation on the first flag signal FLAG_A and the second flag signal FLAG_B provided from the flag control unit 222, the read end signal MEMORY_END provided from the memory 230 and the state signal STATE provided from the latch 225, and generates a state transfer signal TRANS_state. The state transfer signal TRANS_state indicates an AND logic operation of a predetermined state signals among the state signals (AF, BF, AE, BE, A state, B state, Idle, N state). For example, the state transfer signal TRANS_state of ③ shown in the state-transfer diagram of FIG. 3 indicates "AFB and BF and Idle", where AFB indicates an inverted logic (logic 0) of AF.

The latch control unit 224 performs an OR logic operation of the corresponding state transfer signal among the state transfer signals TRANS_state provided from the command decoder 223, and generates a set pulse PULSE_SET and a reset pulse PULSE_RESET.

The state latch 225 includes an SR latch which is set by the set pulse PULSE_SET provided from the latch control unit 224 and which is reset by the reset pulse PULSE RESET provided from the latch control unit 224, latches one state among the first state A state, the second state B state, the standby state Idle state and the neutral state N state, and outputs the corresponding state signal STATE.

The internal clock signal generation unit 226 performs a calculation on the corresponding state signal STATE provided from the state latch 225 and generates the internal clock signal CLK_INT.

Meanwhile, FIGS. 5a to 5f are detailed blocks illustrating elements shown in FIG. 4, FIGS. 6a to 6f are wave form diagrams of the detailed blocks shown in FIGS. 5a to 5f.

The operation of the elements shown in FIG. 4 will be described in details with reference to FIGS. 5a to 5f and FIGS. 6a to 6f.

Figure 5A:
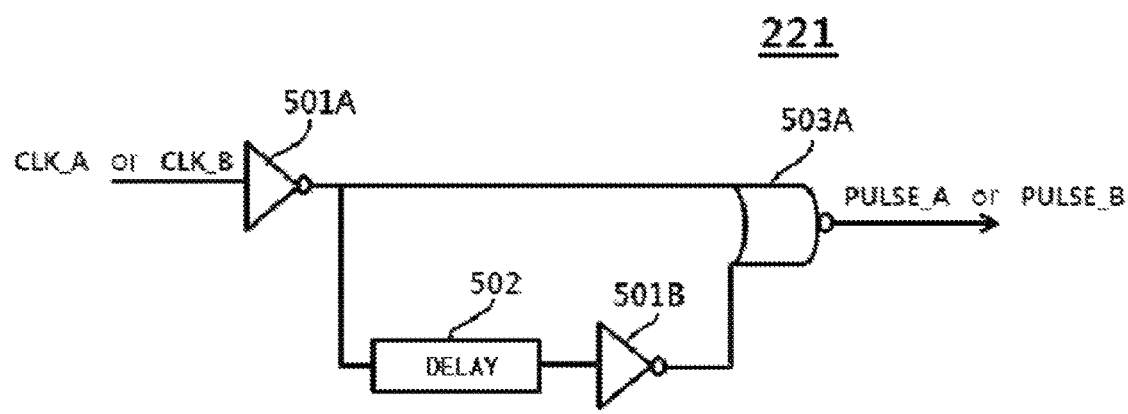
FIG. 5a is a detailed circuit diagram illustrating the pulse generation unit shown in FIG. 4.

Firstly, FIG. 5a is a detailed circuit diagram illustrating the pulse generation unit 221 shown in FIG. 4, as shown in FIG. 5a, the pulse generation unit 221 includes a first inverter 501A, a second inverter 501B, a delayer 502 and a first NOR gate 503A.

The first clock signal CLK_A or the second clock signal CLK_B is provided to an input terminal of the first inverter 501A. An output terminal of the first inverter 501A is directly coupled to an input terminal of the first NOR gate 503A, and, is coupled to the other input terminal of the first NOR gate 503A through the delayer 502 and the second inverter 502B. The first pulse PULSE_A or the second pulse PULSE_B is outputted to the output terminal of the first NOR gate 503A.

Figure 6A:
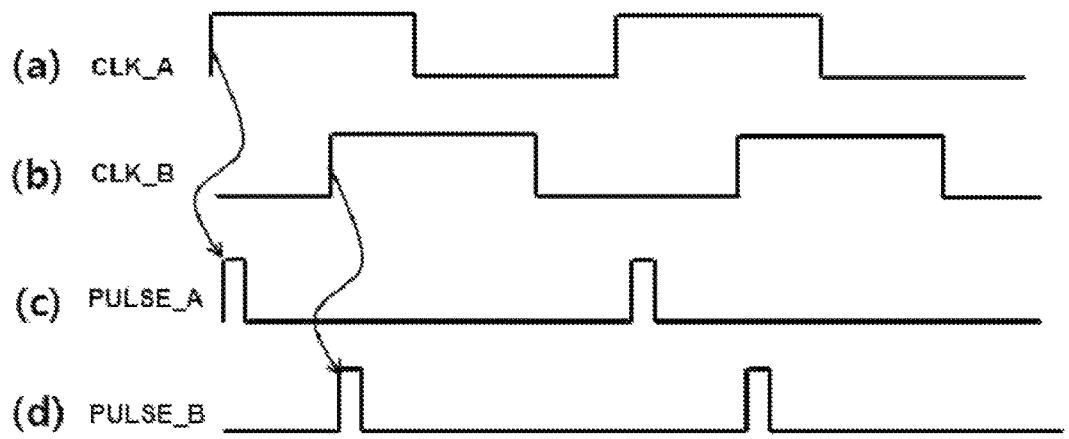
FIG. 6a is a timing diagram illustrating an input signal and an output signal of a pulse generation unit.

For example, if the first clock signal CLK_A as shown in (a) of FIG. 6a is provided to the input terminal of the first inverter 501A, the first inverter 501A inverts and outputs the first clock signal CLK_A to the input terminal of the first NOR gate 503A. Herein, the output signal of the first inverter 501A is delayed by a predetermined time through the delayer 502, is inverted through the second inverter 501B, and then is provided to the other input terminal of the first NOR gate 503A. The first NOR gate 503A performs an NOR operation of the signals inputted through the both input terminals, and generates and outputs the first PULSE_A as shown in (c) of FIG. 6a.

In another example, if the second clock signal CLK_B as shown in (b) of FIG. 6a is provided to the input terminal of the first inverter 501A, the first inverter 501A inverts and provides the second clock signal CLOK_B to the input terminal of the first NOR gate 503A. Herein, the output signal of the first inverter 501A is delayed by a predetermined time through the delayer 502, is inverted through the second inverter 501B, and then is provided to the other input terminal of the first NOR gate 503A. The first NOR gate 503A performs a NOR operation of the signals inputted through both input terminals, generates and outputs the second pulse PULSE_B as shown in (d) of FIG. 6a.

Figure 5B:
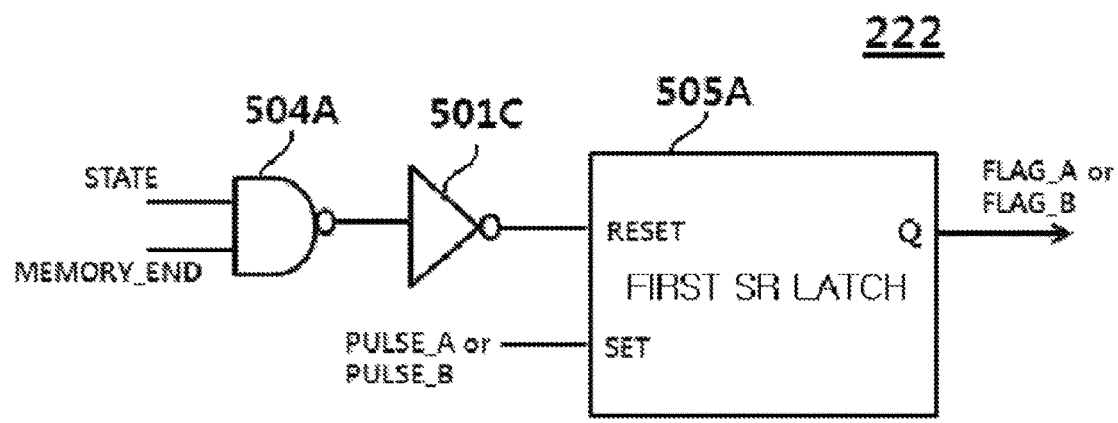
FIG. 5b is a detailed circuit diagram illustrating the flag control unit shown in FIG. 4.

FIG. 5b is a detailed circuit diagram illustrating the flag control unit 222, and as shown in FIG. 5b, the flag control unit 222 includes a first NAND gate 504A, a third inverter 501C and a first SR latch 505A.

The state signal STATE is provided to an input terminal of the first NAND gate 504A, and the read end signal MEMORY_END is provided to the other input terminal of the first NAND gate 504A. The output terminal of the first NAND gate 504A is coupled to a reset terminal RESET of the first SR latch 505A through the third inverter 501C. The first pulse PULSE_A or the second pulse PULSE_B is provided to the set terminal SET of the first SR latch 505A, and the first flag signal FLAG_A or a second flag signal FLAG_B is provided to the output terminal of the first SR latch 505A.

Figure 6B:
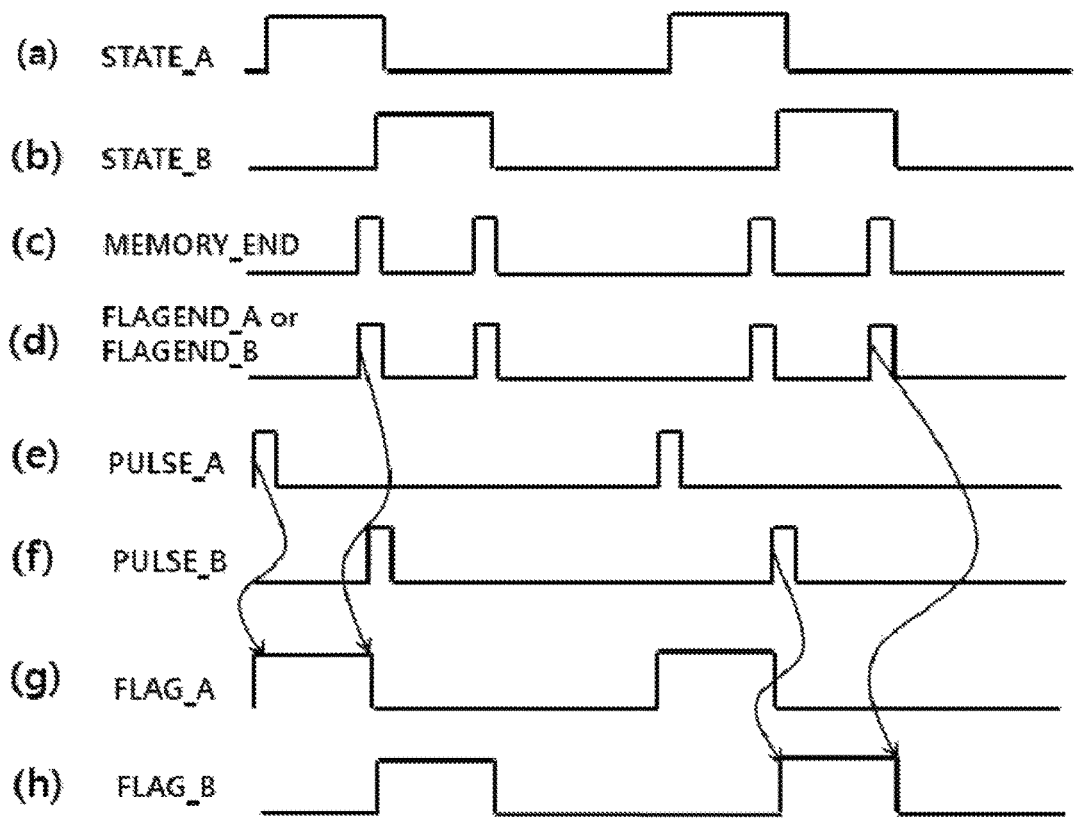
FIG. 6b is a timing diagram illustrating an input signal and an output signal of a flag control unit.

The first state signal STATE_A as shown in (a) of FIG. 6b or the second state signal STATE_B as shown in (b) of FIG. 6b is provided to the input terminal of the first NAND gate 504A, and the read end signal MEMOYR_END as shown in (c) of FIG. 6b is provided to the other input terminal of the first NAND gate 504A. The state signal STATE indicates one of the first state signal STATE_A and the second state signal STATE_B.

The output signal of the first NAND gate is inverted by the third inverter 501C and is outputted as a signal having a shape as shown in (d) of FIG. 6b. A first flag end signal FLAGEND_A or a second flag end signal FLAGEND_B outputted from the third inverter 501C is provided to the reset terminal RESET of the, first SR latch 505A.

The first pulse PULSE_A as shown in (e) of FIG. 6b or the second pulse PULSE_B as shown in (f) of FIG. 6b is provided to the set terminal SET of the first SR latch 505A.

Thus the first flag signal FLAG_A as shown, in (g) of FIG. 6b or the second flag signal FLAG_B as shown in (h) of FIG. 6b is outputted to the output terminal Q of the first SR latch 505A.

Figure 5C:
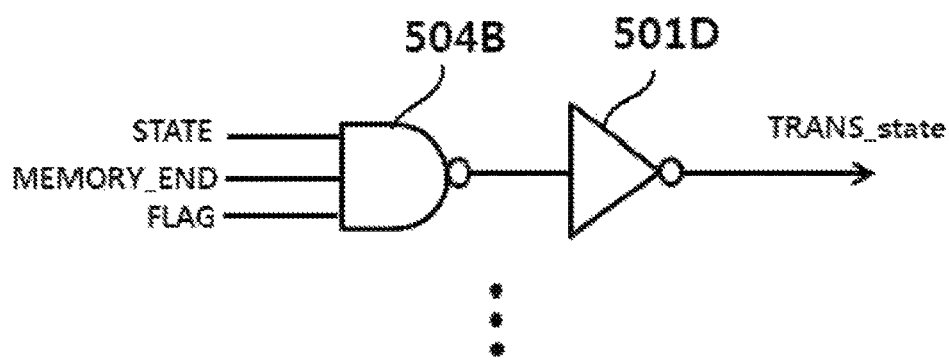
FIG. 5c is a detailed circuit diagram illustrating the command decoder shown in FIG. 4.

FIG. 5c is detailed circuit diagram illustrating the command decoder 223, and as shown in FIG. 5c, the command decoder 223 includes a second NAND gate 504B and a fourth inverter 501D, which are serially coupled to each other.

The state signal STATE is provided to a first input terminal of the second NAND gate 504B, the read end signal MEMORY_END is provided to a second input terminal of the second NAND gate 504B, and the flag signal FLAG is provided to a third input terminal of the second NAND gate 504B. The signals, which are inputted to the first to third input terminals of the second NAND gate 504B are not fixed the above-described signals and are determined according to the state transfer condition as shown in FIG. 3. For example, in case of the state transfer condition of ⑦ of the state-transfer diagram shown in FIG. 3, signals, which are provided to the first to third input terminals of the second NAND gate 504B, are AFB, BF and N state. Herein, the AFB indicates an inverted logic of the AF.

The output terminal of the second NAND gate 504B is coupled to the input terminal of the fourth inverter 501D, and the state transfer signal TRANS_state is outputted from the output terminal of the fourth inverter 501D. The flag signal FLAG indicates one of the first flag signal FLAG_A or the second flag signal FLAG_B.

Figure 6C:
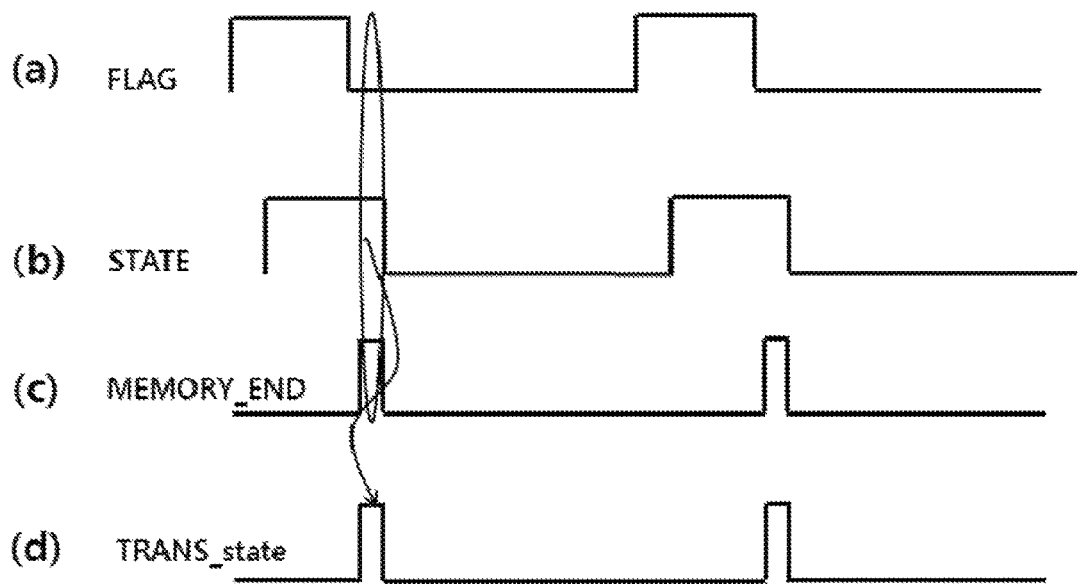
FIG. 6c is a timing diagram illustrating an input signal and an output signal of a command decoder.

The second NAND gate 504B performs a calculation on the state signal as shown in (b) of FIG. 6c provided to a first input terminal, the read end signal MEMORY_END as shown in (c) of FIG. 6c provided to a second input terminal and the first flag signal FLAG_A as shown in (a) of FIG. 6c provided to a third input terminal, and outputs a signal as a calculated result.

The fourth inverter 501D inverts the output signal of the second NAND gate 504B and outputs the state transfer signal TRANS_state as shown in (d) of FIG. 6c.

In FIG. 5C, one state transfer signal output circuit for outputting a state transfer signal TRANS_state through the second NAND gate 504B and the fourth inverter 501D, which are coupled in series, is described, but this state transfer signal output circuit may be added as many as the number of the state transfer signals.

Figure 5D:
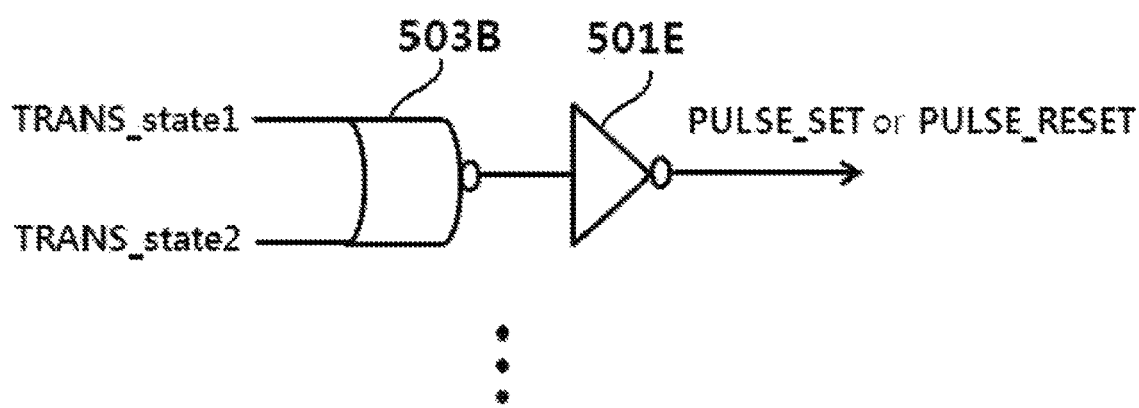
FIG. 5d is a detailed circuit diagram illustrating the latch control unit shown in FIG. 4.

FIG. 5d is a detailed circuit diagram illustrating the latch control unit 224, and as shown in FIG. 5d, the latch control unit 224 includes a second NOR gate 503B and a fifth inverter 501E, which are coupled in series.

A first state transfer signal TRANS_state is provided to an input terminal of the second NOR gate 503B, and a second state transfer signal TRANS_state2 is provided to the other input terminal of the second NOR gate 503B. An output terminal of the second NOR gate 503B is coupled to an input terminal of the fifth inverter 501E, and the set pulse PULSE_SET or the reset pulse PULSE_RESET is outputted from the output terminal of the fifth inverter 501E.

The first state transfer signal TRANS_state1 and the second state transfer signal TRANS_state2 indicate an AND operation result on signals of corresponding conditions among the state signals AF, BF, AE, BE, A state, B state, Idle, N sate.

Figure 6D:
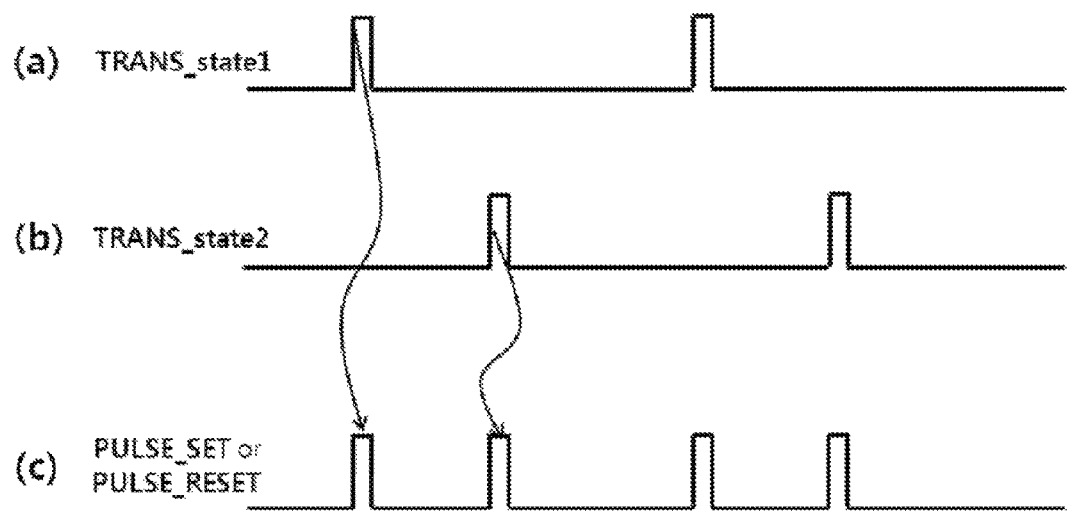
FIG. 6d is a timing diagram illustrating an input signal and an output signal of a latch control unit.

The second NOR gate 503B performs a NOR operation on the first state transfer signal TRANS_state1 as shown in (a) of FIG. 6d and the second state transfer signal TRANS_state2 as shown in (b) of FIG. 6d, and outputs a signal as the NOR operation result.

The fifth inverter 501E inverts the output signal of the second NOR gate 503B and outputs the set pulse PULSE_SET or the reset pulse PULSE_RESET as shown in (c) of FIG. 6d.

In FIG. 5d, one output circuit for outputting the set pulse PULSE_SET or the reset pulse PULSE_RESET through the second NOR gate 503B and the fifth inverter 501E, which are coupled in series, is described, but this output circuit may be added as many as the number of the set pulse PULSE_SET or the reset pulse PULSE_RESET.

Figure 5E:
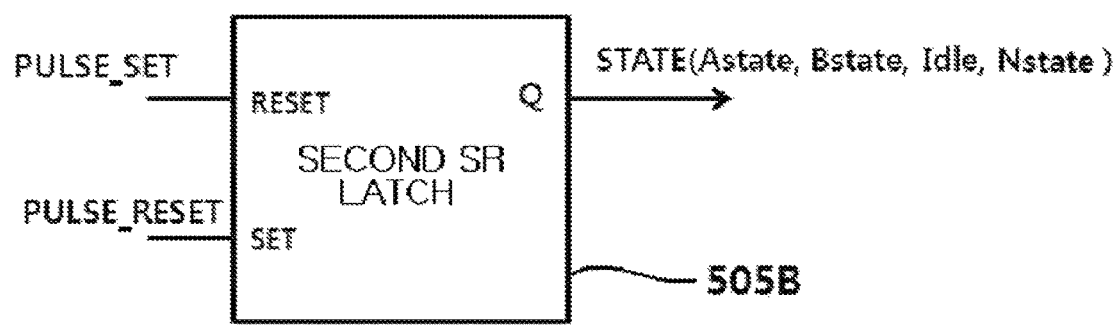
FIG. 5e is a detailed circuit diagram illustrating the state latch shown in FIG. 4.

FIG. 5e is a detailed circuit diagram illustrating the state latch 225, and as shown in FIG. 5e, the state latch 225 includes the second SR latch 505B.

Figure 6E:
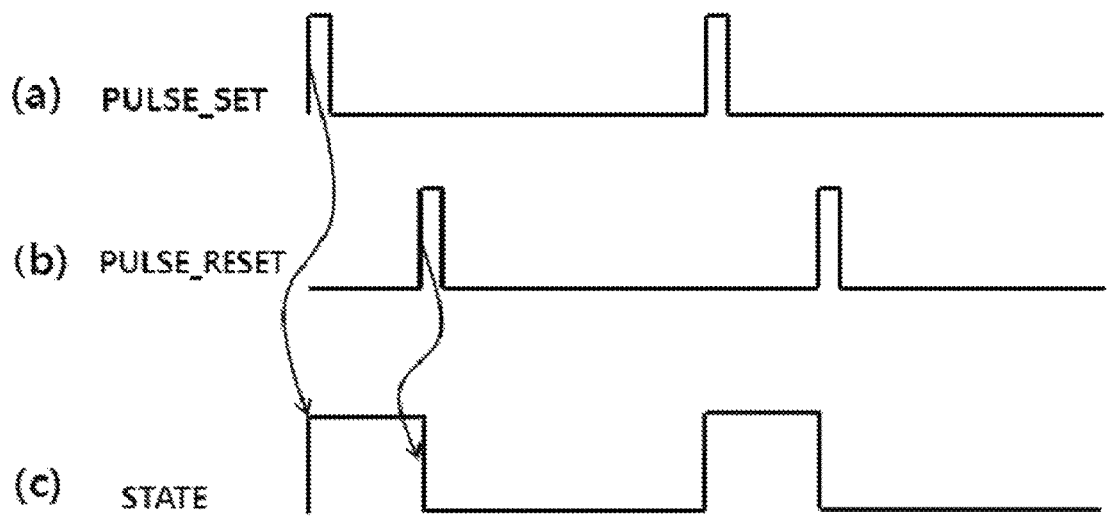
FIG. 6e is a timing diagram illustrating an input signal and an output signal of a state latch.

The set pulse PULSE_SET as shown in (a) of FIG. 6e is provided to a set terminal SET of the second SR latch 505B, or the reset pulse PULSE_RESET as shown in (b) of FIG. 6e is provided to a reset terminal RESET of the second SR latch 505B. Thus, the state signal STATE as shown in (c) of FIG. 6e is outputted to an output terminal Q of the second SR latch 505B. The state signal STATE indicates one of the first state signal A state, the second state signal B state, the standby state idle and the neutral state N state.

FIG. 5f is a detailed circuit diagram illustrating the internal clock signal generation unit 226, and as shown in FIG. 5f, the internal clock signal generation unit 226 includes a first start pulse generator 506A, a second start pulse generator 510 and an internal clock signal generator 520.

Figure 6F:
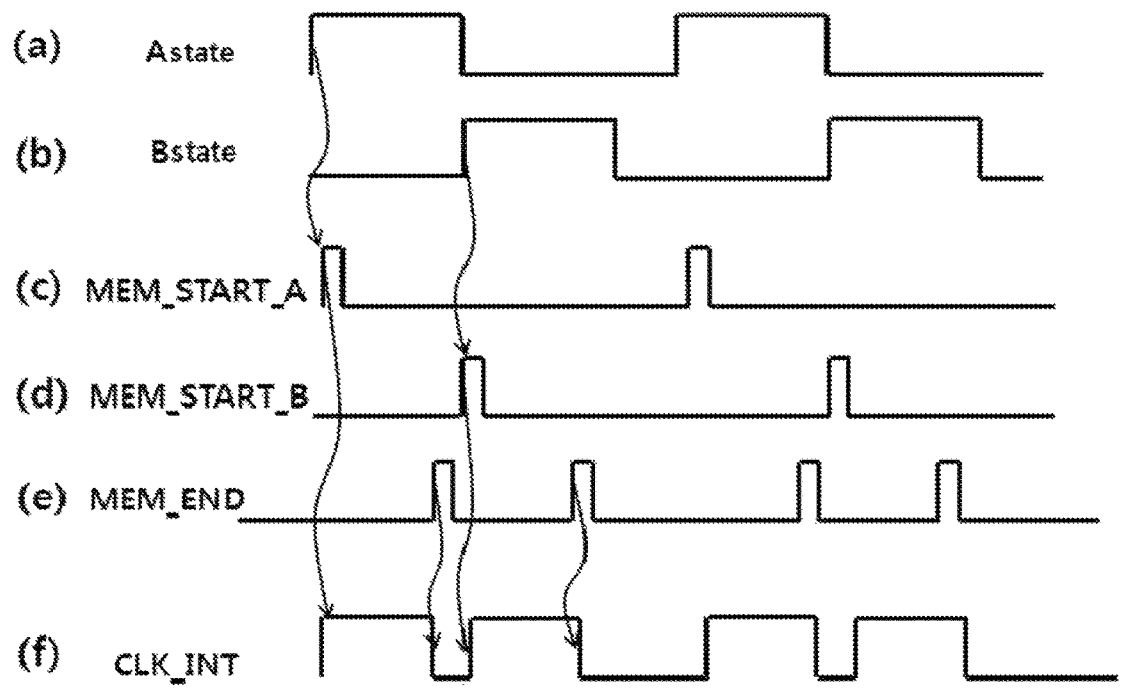
FIG. 6f is a timing diagram illustrating an input signal and an output signal of an internal clock signal generation unit.

The first start pulse generator 506A receives the first state signal A state as shown in (a) of FIG. 6f from the state latch 225, and generates a first memory start pulse MEM_START_A as shown in (c) of FIG. 6f. If the first state signal A state is compared with the first memory start pulse MEM_START_A, a rising edge of the first memory start pulse MEM_START_A lags behind a rising edge of the first state signal A state, and a 'high' retention period of the first memory start pulse MEM_START_A is much shorter than a 'high' retention period of the first state signal A state.

The second start pulse generator 510 has a structure that an output terminal of the third NAND gate 504C is coupled to an input terminal of the second pulse generator 506B through a sixth inverter 501F. The third NAND gate 504C performs a NAND operation on the second state signal B state as shown in (b) of FIG. 6f provided to the input terminal and the a second state delayed signal B state_Delay that the second state signal B state provided to the other input terminal is delayed, and output a result signal of the NAND operation.

An output signal of the third NAND gate 504C is inverted by the sixth inverter 501F. The second pulse generator 506B receives the output signal of the sixth inverter 501F, and generates a second memory start pulse MEM_START_B as shown in (d) of FIG. 6f. If the second state signal B state is compared with the second memory start pulse MEM_START_B, a rising edge of the second memory start pulse MEM_START_B lags behind a rising edge of the second state B state, and a 'high' retention period of the second memory start pulse MEM_START_B is much shorter than a 'high' retention period of the second state signal B state.

The internal clock signal generator 520 includes a third SR latch 505C, a fourth SR latch 505D, third NOR gate 503C and a seventh inverter 501G. The third SR latch 505C is reset in response to the read end signal MEMORY_END provided to the reset terminal RESET and is set in response to the first memory start pulse MEMORY_START_A provided to tie set, terminal SET. The fourth SR latch 505D is set in response to the first memory start pulse MEM_START_B provided to the set terminal SET. The third NOR gate 503C performs a NOR operation on an output signal of the fourth SR latch 505D. The seventh inverter 501G inverts the output signal of the third NOR gate 503C and outputs the internal clock signal CLK_INT.

The third SR latch 505C is reset in response to the read end signal MEMORY_END provided to the reset terminal RESET, or s set in response to the first memory start pulse MEM_START_A provided to the set terminal SET, and outputs a first internal clock signal CLK_INT_A to the output terminal Q.

The fourth SR latch 505D is reset in response to the read end signal MEMORY_END provided to the reset terminal RESET or is set in response to a second memory start pulse MEM_START_B provided to the set terminal SET, and outputs a second internal clock signal CLK_INT_B to the output terminal Q.

The third NOR gate 503C performs a NOR operation on the first internal clock signal CLK_INT_A and the second internal clock signal CLK_INT_B and outputs the NOR operation result.

The seventh inverter 501G inverts the output signal of the third NOR gate 503C and outputs the internal clock signal CLK_INT as shown in (f) of FIG. 6f.

In the above-described embodiment, SR latches are used as elements for storing each state, but are not restricted in the embodiment, and a D-type flip-flop or T-type flip-flop may be used as the elements for storing each state.

Meanwhile, (a) to (h) of FIG. 7 show examples of generating the internal clock signal CLK_INT corresponding to a first clock signal CLK_A and a second clock signal CLK_B.

The first state signal A state as shown in (e) of FIG. 7 is generated corresponding to the first clock signal CLK_A as shown in (a) of FIG. 7. Also, the second state signal B state as shown in (g) of FIG. 7 is generated corresponding to the second clock signal CLK_B as shown in (b) of FIG. 7.

As shown in (e) to g) of FIG. 7, the neutral state N state exists between each falling edge of the first clock signal CLK_A and a rising edge of the second clock signal CLK_B.

And, as shown in (e) to (h) of FIG. 7, the internal clock signal CLK_INT is generated in synchronization with the rising edge timing of the first clock signal CLK_A and the second clock signal CLK_B, and a period corresponding to the neutral state signal N state exists between two pulses of the internal clock signal CLK_INT. This period indicates the neutral state N state through which the first state A state is transferred to the second state B state as shown in FIG. 3 or the second state B state is transferred to the first state A state.

As shown in (a), (b), (e) and (h) of FIG. 7, in case that an interrupt occurs between the first clock signal CLK_A and the second clock signal CLK_B, as described above, the second state B state is terminated and is transferred to the firs state A state, and the internal clock signal CLK_INT is generated.

Herein, an invalid pulse of the second state signal B state as shown in (g) of FIG. 7 is removed through the above-described process, and is not included in the internal clock signal CLK_INT.

Although various embodiments have been described for illustrative purposes, it will be apparent to those skilled in the art that various changes and modifications may be made without departing from the spirit and scope of the invention as defined in the following claims.

What is claimed is:

1. A circuit for controlling access to a memory using an arbiter, comprising:
   a controller for outputting a first clock signal to a first port and outputting a second clock signal to a second port;
   the arbiter for generating an internal clock signal by a state transfer among a first state for generating the first clock signal, a second state for generating the second clock signal, a standby state and a neutral state when the internal clock signal is generated based on the first clock signal, the second clock signal and a read end signal; and
   a memory for outputting the read end signal to the arbiter, and providing a first output data or a second output data to the controller by a read-access according to the internal clock signal.

2. The circuit for controlling access to the memory using the arbiter of claim 1, wherein the arbiter transfers the first state to the second state or the second state to the first: state through the neutral state.

3. The circuit for controlling access to the memory using the arbiter of claim 1, wherein when the first state is transferred to the second state, if a first state signal which is enabled in the first state, a first port read end signal for a first port and a second flag signal are enabled when the second clock signal is provided through a second port, the arbiter transfers the first state to the neutral state.

4. The circuit for controlling access to the memory using the arbiter of claim 2, wherein when the second state is transferred to the first state, if a first flag signal which is enabled when the first clock signal is provided through the first port and a neutral state signal which is enabled in the neutral state are enabled, and a second flag signal which is enabled when the second clock signal is provided through the second port is disabled, the arbiter transfers the neutral state to the first state.

5. The circuit for controlling access to the memory using the arbiter of claim 2, wherein when the first state is transferred to the second state, if a first flag signal which is enabled when the first clock signal is provided through the first port is disabled, and a second flag signal which is enabled when the second clock signal is provided through the second port is enabled and a neutral state signal which is enabled in the neutral state are enabled, the arbiter transfers the neutral state to the second state.

6. The circuit for controlling access to the memory using the arbiter of claim 2, wherein when the second state is transferred to the first state, if a second port end signal for the second port, a first flag signal which is enabled when the first clock signal is provided through the first port, and a second state which is enabled in the second state are enabled, the arbiter transfers the second state to the first state.

7. The circuit for controlling access to the memory using the arbiter of claim 2, wherein when the second state is transferred to the first state, if a first flag signal which is enabled when the first clock signal is provided through the first port, a second flag signal which is enabled when the second clock signal is provided through the second port, a first state signal which is enabled in the first state, and a second state signal which is enabled in the second state are enabled, the arbiter transfers the second state to the first state.

8. The circuit for controlling access to the memory using the arbiter of claim 1, wherein the arbiter comprises:
- a pulse generation unit for generating a first pulse synchronized with a rising edge of the first clock signal and a second pulse synchronized with a rising edge of the second clock signal;
- a flag control unit for generating a first flag signal and a second flag signal based on the first pulse, the second pulse and the read end signal;
- at least one command decoder for state transfer signals based on the first flag signal the second flag signal, the read end signal and the state signal provided from a state latch;
- at least one latch control unit for receiving the state transfer signals and generating a set pulse and a reset pulse;
- the state latch including an SR latch, which is set by the set pulse and is reset by the reset pulse, for latching one of the first state, the second state, the standby state and the neutral state, and outputting a corresponding state signal; and
- an internal clock signal generation unit for generating the internal clock signal based on the corresponding state signal.

9. The circuit for controlling access to the memory using the arbiter of claim 8, wherein the pulse generation unit comprises:
- a first inverter for inverting and outputting the first clock signal or the second clock signal;
- a delayer for delay and outputting an output signal of the first inverter;
- a second inverter for inverting and outputting an output signal of the delayer; and
- a first NOR gate for performing a NOR operation on the output signal of the first inverter and the output signal of the second inverter, and outputting the first pulse or the second pulse according to result of the NOR operation.

10. The circuit for controlling access to the memory using the arbiter of claim 8, wherein the flag control unit comprises:
- a first NAND gate for performing a NAND operation on the state signal and the read end signal;
- a third inverter for inverting and outputting an output signal of the first NAND gate; and
- a first SR latch for operating in response to an output signal of the third inverter provided to a reset terminal and the first pulse or the second pulse provided to a set terminal, and outputting the first flag signal or the second flag signal.

11. The circuit for controlling access to the memory using the arbiter of claim 8, wherein the command decoder comprises:
- a second NAND gate for performing a NAND operation on at least two signals among the first flag signal, the second flag signal, the read end signal and the state signal such that a predetermined state among the first state, the second state, the standby state and the neutral state is transferred to other state; and
- a fourth inverter for inverting an output signal of the NAND gate and outputting a state transfer signal.

12. The circuit for controlling access to the memory using the arbiter of claim 11, wherein the state transfer signal is a predetermined one among the first flag signal, the second flag signal, the first port read end signal, the second port read end signal, the first state signal, the second state signal, the standby signal and the neutral state signal.

13. The circuit for controlling access to the memory using the arbiter of claim 8, wherein the latch control unit comprises:
- a second NOR gate for performing a NOR operation on the first state transfer signal and the second state transfer signal; and
- a fifth inverter for inverting an output signal of the second NOR gate and outputting the set pulse or the reset pulse.

14. The circuit for controlling access to the memory using the arbiter of claim 13, wherein the first state transfer signal and the second state transfer signal are result signals of the NAND operation on signals of corresponding condition for transferring a predetermined one among the first state, the second state, the standby state and the neutral state to other state.

15. The circuit for controlling access to the memory using the arbiter of claim 8, wherein the internal clock signal generation unit comprises:
- a first start pulse generator for receiving the first state signal form the state latch and generating a first memory start pulse;
- a second start pulse generator for generating a second memory start pulse based op the second state signal and a second state delayed signal; and
- an internal clock signal generator for generating the internal clock signal based on the first memory start pulse, the second memory start pulse and the read end signal.

16. The circuit for controlling access to the memory using the arbiter of claim 15, wherein the second start pulse generator comprises:
- a third NAND gate for performing a NAND operation on the second state signal and the second state delayed signal;
- a sixth inverter for inverting and outputting an output signal of the third NAND gate; and
- a second pulse generator for generating the second memory start pulse based on an output signal of the sixth inverter.

17. The circuit for controlling access to the memory using the arbiter of claim 15, wherein the internal clock signal generator comprises:
- a third SR latch that is reset in response to the read end signal, or is set in response to the first memory start pulse, and outputting a first internal clock signal;
- a fourth SR latch that is reset in response to the read end signal, or is set in response to the second memory start pulse, and outputting a second internal clock signal;
- a third NOR gate for performing a NOR operation on the first internal clock signal and the second internal clock signal and outputting a signal as a result signal of the NOR operation; and
- a seventh inverter for inverting an output signal of the third NOR gate and outputting the internal clock signal.

* * * * *